US006646615B2

(12) United States Patent
Andrews et al.

(10) Patent No.: US 6,646,615 B2
(45) Date of Patent: Nov. 11, 2003

(54) METHOD AND APPARATUS FOR WIRELESS COMMUNICATION UTILIZING ELECTRICAL AND MAGNETIC POLARIZATION

(75) Inventors: Michael R Andrews, Berkeley Heights, NJ (US); Michael James Gans, Holmdel, NJ (US); Partha Pratim Mitra, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 89 days.

(21) Appl. No.: 09/733,478

(22) Filed: Dec. 8, 2000

(65) Prior Publication Data

US 2002/0113748 A1 Aug. 22, 2002

(51) Int. Cl.[7] .................................................. G01S 3/02
(52) U.S. Cl. ........................................ 343/726; 343/850
(58) Field of Search ................................. 343/725, 853, 343/893, 726, 728, 741, 795

(56) References Cited

U.S. PATENT DOCUMENTS

| | | | | |
|---|---|---|---|---|
| 4,588,993 A | * 5/1986 | Babij et al. | ................. | 343/351 |
| 5,300,885 A | 4/1994 | Bull et al. | .................. | 324/247 |
| 5,719,586 A | * 2/1998 | Tuttle | ......................... | 343/726 |
| 6,097,771 A | 8/2000 | Foschini et al. | ............ | 375/346 |
| 6,140,972 A | * 10/2000 | Johnston et al. | ............ | 343/725 |

OTHER PUBLICATIONS

Telatar, I.E., "Capacity of Multi–antenna gaussian channels," *European transactions on Telecommunications 10* pp. 585–595 (1999).

Kraus, J.D., *Antennas,* 2d. Ed., McGraw–Hill (1988).

Proakis, J.G. *Digital–Communications,* 3d Ed., WCB–McGraw–Hill, pp. 795–806 (1995).

Morgan, M. et al., "Synthesis and analysis of elliptic polarization loci in terms of space–quadrature sinusoidal components", *Proc. IRE.,* 39, pp. 552–556 (1951).

Hatke, G.F., "Conditions for unambiguous source location using polarization diverse arrays", IEEE Twenty–seventh Asilomar Conference on Signals, Systems & Computers, pp. 1365–1369 (1993).

Afraimovich, E.L., et al., "Determining polarization parameters and angles of arrival of hf radio signals using three mutually orthogonal antennas", *Radio Science 34,* p. 1217–1225 (1999).

Smith, D.R. et al., "Compose Medium with Simultaneously Negative Permeability and Permittivity", *Physical Review Letters,* vol. 84, No. 18. pp. 4184–4187 (2000).

U.S. patent application Ser. No. 09/379,151, filed Aug. 23, 1999.

U.S. patent application Ser. No. 09/477,972, filed Jan. 5, 2000.

U.S. patent application Ser. No. 09/060,657, filed Apr. 15, 1998.

U.S. patent application Ser. No. 09/438,900, filed Nov. 12, 1999.

U.S. patent application Ser. No. 09/587,396, filed Jun. 5, 2000.

* cited by examiner

*Primary Examiner*—James Clinger
(74) *Attorney, Agent, or Firm*—M. I. Finston

(57) ABSTRACT

A method of wireless communication is disclosed, in which polarization diversity can be utilized to improve fading performance or to increase the capacity of the communication channel in a scattering environment. Complementary signal information is impressed upon, or derived from, corresponding electric and magnetic polarized field components of a transmitted or intercepted electromagnetic wave. Four, five, or even six independent signal channels can thereby be utilized for communication using a localized antenna arrangement.

15 Claims, 3 Drawing Sheets

METHOD AND APPARATUS FOR WIRELESS COMMUNICATION UTILIZING ELECTRICAL AND MAGNETIC POLARIZATION

FIELD OF THE INVENTION

This invention relates to wireless communication. More particularly, the invention relates to the use of antennas designed to utilize more than one polarization component of transmitted or received electromagnetic radiation.

ART BACKGROUND

One advantage of communication over multiple propagation channels is that it is less susceptible to fading than is single-channel communication. Fading is the loss of received signal power due to destructive interference or obstructions in the propagation channel of the signal. The use of multiple propagation channels can mitigate the effects of fading because, if the various channels have statistically independent fading behavior, it will be unlikely for all channels to be equally affected by fading at a given time. Thus, even if some propagation channels are degraded by fading at a given time, it is likely that there will be other channels that have good quality.

Another advantage of the use of multiple propagation channels is that it affords higher capacity. One particular consequence of this is an increase in the practicality of sending redundant information, so that, for example, data corrupted by fading can be corrected.

The availability of alternate propagation channels due to transmission or reception at multiple polarizations is referred to as "polarization diversity." Polarization diversity is helpful for mitigating fading effects because in scattering environments, mutually orthogonal polarization channels generally suffer fading effects that are at least partially independent. Fading effects are "independent" in this regard if they have a relatively low statistical correlation.

Prior art systems for wireless communication have embodied the long-recognized constraint, imposed by Maxwell's equations, that signals transmitted through free space in a straight line from point A to point B, and differing only in their polarization modes, can comprise at most two independent signal channels. Mathematically stated, the maximum number of independent communication channels cannot exceed the rank of a matrix H whose elements are coefficients relating the electric and magnetic field components at A to the electric and magnetic multipole moments of an electric current distribution localized at B. For free-space, line-of-sight communication between two points, such a matrix has rank 2 in the far-field limit.

As a consequence, a typical antenna of the prior art, designed for multi-channel reception or transmission at a single geographical point, consists of a pair of mutually orthogonal dipole elements, each effective for receiving or transmitting electromagnetic radiation having a corresponding polarization mode. Thus, each dipole element is effective for communicating over a distinct physical propagation channel, characterized by its polarization.

Because it has generally been believed that only two polarization channels are available at a given point, efforts to increase the number of propagation channels have focused on geographically distributed antenna arrays. That is, if a pair of antenna elements are separated by a sufficient distance, typically of about a communication wavelength or more, their respective propagation paths to or from a common receive or transmit antenna, in a scattering environment, will generally suffer fading effects that are at least partially independent. The availability of such alternate channels due to transmission from or reception at multiple, spatially separated antenna elements is referred to as "spatial diversity."

It has recently been pointed out that in a rich scattering environment, i.e., where a significant fraction of received signal energy comes from scattering paths rather than from direct line-of-sight, there will generally be three, and not two, polarization channels available at any given point. This is explained, for example, in U.S. patent application Ser. No. 09/379151, filed on Aug. 23, 1999, and in a continuation-in-part thereof having Ser. No. 09/477972, filed on Jan. 5, 2000, both commonly assigned herewith. As a consequence of the third polarization channel, rich scattering environments potentially offer more polarization diversity than is available for pure line-of-sight communication.

Every increase in diversity has the potential to further improve reception in the presence of fading. For that reason among others, it is advantageous to find still further forms of diversity.

SUMMARY OF THE INVENTION

We have discovered that in a rich scattering environment, there are potentially six, and not merely two or three, independent polarization channels. Therefore, in such environments the opportunity for achieving polarization diversity using a spatially localized antenna is three times that available in free-space, line-of-sight communication.

Accordingly, the invention involves transmitting or receiving one or more wireless communication signals using four or more independent polarization channels at a single spatial location.

For example, the invention in one broad aspect pertinent to reception is a method that includes the steps of: (a) demodulating four or more current outputs from an antenna arrangement selected to be responsive to both the electric component and the corresponding magnetic component of at least one incident electromagnetic wave; and (b) combining the four or more demodulated outputs, thereby to recover signal information in one or more signal channels. Step (b) is carried out such that said electric component and said magnetic component make independent contributions to a total capacity for recovering signal information from the current outputs of the antenna arrangement.

The invention in one broad aspect pertinent to transmission is a method that includes the steps of: (a) modulating signal information in one or more signal channels onto a radiofrequency carrier so as to provide four or more carrier-level signals; and (b) applying each carrier-level signal to a respective input of an antenna arrangement. Significantly, the antenna arrangement is of a kind that, when operated in reception, is responsive to both the electric component and the corresponding magnetic component of at least one incident electromagnetic wave. Step (b) is carried out so as to impress at least partially independent signal information on, respectively, the electric and corresponding magnetic components of the outgoing counterpart of said incident electromagnetic wave.

DETAILED DESCRIPTION

Figure 1:
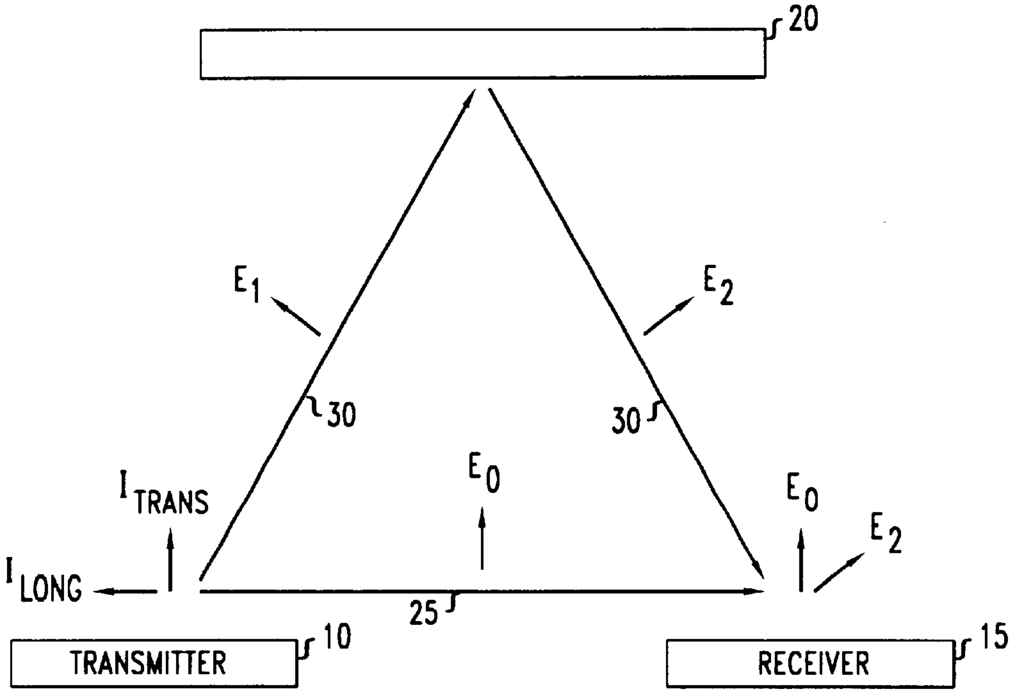
FIG. 1 is a conceptual drawing of an idealized physical propagation channel for radiofrequency communication, in which there is a line-of-sight path and a reflective path for transmission from a transmitter to a receiver.

How a third polarization channel arises in the presence of scattering will be understood with reference to FIG. 1, which depicts a transmit antenna 10, a receive antenna 15, and a reflective plane 20, referred to herein as a "mirror." Antenna 10 is depicted as comprising a transverse dipole element within which there oscillates a transverse electric current $I_{trans}$, and a longitudinal dipole element within which there oscillates a longitudinal electric current $I_{long}$. The "transverse" and "longitudinal" directions are defined relative to the line of sight between antenna 10 and antenna 15.

The oscillating current $I_{trans}$ gives rise, inter alia, to the electromagnetic wave 25 that propagates along the line of sight from antenna 10 to antenna 15 with polarization vector $E_0$. At antenna 15, wave 25 is detected with polarization $E_0$, as indicated in the figure.

The oscillating current $I_{long}$ does not contribute any polarization component to the wave 25, because Maxwell's equations preclude free-space propagation of longitudinally polarized electromagnetic waves.

However, in the particular example depicted in FIG. 1, the superposition of currents $I_{trans}$ and $I_{long}$ gives rise, inter alia, to the electromagnetic wave 30 that propagates in a straight line from antenna 10 to mirror 20, and from mirror 20 to antenna 15. Wave 30 initially has polarization vector $E_1$, with both longitudinal and transverse components. Upon reflection, the polarization vector of wave 30 changes to vector $E_2$, which also has both longitudinal and transverse components. At antenna 15, wave 30 is detected with polarization $E_2$, having both longitudinal and transverse components, as indicated in the figure.

Not shown in the figure is a further dipole element of antenna 10, oriented perpendicular to the plane of the figure. An oscillating electric current in such further dipole element gives rise, inter alia, to a further polarization component of electromagnetic wave 25, directed perpendicular to the plane of the figure. Thus, in all, there are two transverse polarization components and one longitudinal polarization component detectable at antenna 15.

Figure 2:
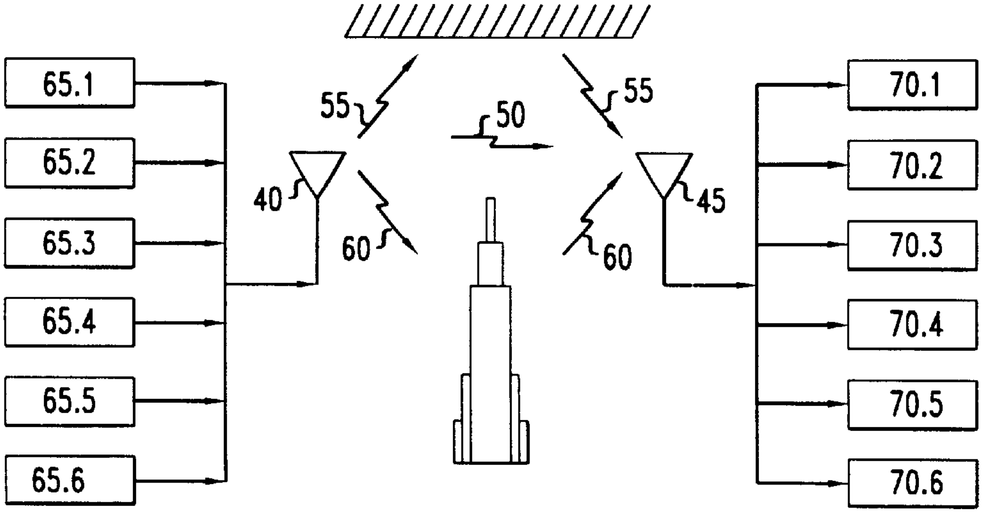
FIG. 2 is a conceptual drawing of a wireless communication system operating in a simplified scattering environment, in which a plurality of independent signal channels are sent and received in accordance with the invention in an exemplary embodiment.

Shown conceptually in FIG. 2 is a wireless communication system operating in a scattering environment. Transmit antenna 40 and receive antenna 45, both shown symbolically in the figure, communicate over a physical propagation channel that, illustratively, includes direct line-of-sight path 50, atmospheric scattering path 55, and scattering path 60, which includes one or more terrestrial objects. Antenna 40 has up to six input connections 65.1–65.6, each potentially fed by a respective, independent signal channel modulated onto an appropriate radiofrequency carrier. Antenna 45 has up to six output connections 70.1–70.6, at each of which an oscillating electric current, induced by intercepted electromagnetic radiation, is potentially tapped for demodulation, detection, and signal recovery.

Antenna 40 may stand alone, or it may be but one local element in an array of transmit antennas. Similarly, antenna 45 may stand alone, or it may be but one local element in an array of receive antennas. In either case, it is significant that antennas 40 and 45 are local. By local is meant that spatial diversity within the antenna itself does not significantly affect the far-field radiation of the antenna in transmission, and does not significantly affect, in reception, the differences among the induced currents tapped at the various antenna outputs. Generally, the dipole, loop, or other specifically designated sensing elements of a local antenna are all disposed within a spatial region boundable by a sphere whose diameter is one communication wavelength. Often, it will be advantageous to integrate such elements within an even smaller region, boundable by a sphere whose diameter is one-half the communication wavelength. It should be noted in this regard that the smaller antennas can be made resonant by adding a matching circuit.

Associated with the communication system of FIG. 2 is a transfer matrix H. The matrix is an M×N matrix, where M is the number of inputs of transmit antenna 40, and N is the number of outputs of receive antenna 45. Extensions of this concept to arrays of individual antennas (each of which may have multiple inputs or outputs) will be readily understood by those skilled in the art and need not be described here. Each element $h_{ij}$, i=1, . . . , M, j=1, . . . , N, is a propagation coefficient that relates the current tapped at an output of antenna 45 to an input to antenna 40. For example, a receiver at antenna 45 can acquire the transfer matrix by receiving prearranged pilot signals from transmit antenna 40. According to one scheme, a sinusoidal pilot signal at a distinct frequency is applied to each input of antenna 40, and the complex amplitude (which subsumes both the phase and the real amplitude) of the response is measured at each output of antenna 45.

The element $h_{ij}$ is set to such value that the response at output i is (with suitable normalization) equal to the product of $h_{ij}$ times the signal applied at input j. The frequencies of the sinusoidal pilot signals are all advantageously chosen to lie within a frequency band so narrow that fading behavior is approximately independent of frequency thereover. In indoor experiments using a tripolarized (i.e., consisting of three mutually orthogonal dipole elements) transmit antenna and a tripolarized receive antenna, we found that fading behavior had no significant variation over bands 20 kHz in width, centered near the frequency corresponding to a communication wavelength of about 34 cm, i.e., a frequency of about 0.9 GHz.

In matrix notation, it is convenient to relate the vector Y of complex amplitudes at the outputs of antenna 45 to the vector X of complex amplitudes applied to the inputs of antenna 40 by the equation Y=HX+V, where V represents a vector of additive noise.

It will be understood that by appropriately stimulating three dipole elements, all local to each other and none parallel to any other, it is possible to produce, for the antenna as a whole, an (oscillating) electric dipole of any orientation. Similarly, by appropriately stimulating three loop elements, all local to each other and none parallel to any other, it is possible to produce, for the antenna as a whole, an (oscillating) magnetic dipole of any orientation.

Let p represent the electric dipole moment and let m represent the magnetic dipole moment of a transmitting antenna at a given instant of time. A further matrix $\hat{H}$ relates the electric field E(r) and the magnetic field B(r) at an arbitrary point r in the radiation field of the antenna to the electric and magnetic dipole moments according to the following equation, in which c represents the velocity of light, the antenna is taken to be positioned at the origin of coordinates, and all physical quantities are taken to be expressed in SI units:

$$\begin{bmatrix} E(r) \\ cB(r) \end{bmatrix} = \hat{H}(r)\begin{bmatrix} cp \\ m \end{bmatrix}.$$

Those skilled in the art will appreciate that in free space and in the far field, $\hat{H}$ reduces to a matrix $\hat{H}_0$ given by the matrix equation:

$$\hat{H}_0(r) = -\frac{|k|^3}{\varepsilon_0 c}\frac{e^{-ik\cdot r}}{4\pi k\cdot r}\begin{bmatrix} \mathcal{J}^2(\hat{r}) & \mathcal{J}(\hat{r}) \\ -\mathcal{J}(\hat{r}) & \mathcal{J}^2(\hat{r}) \end{bmatrix},$$

wherein k is the pertinent wave vector, $$\frac{1}{\varepsilon_0 c}$$

is the impedance of free space, and $\Im$ is a 3x3 matrix defined, in terms of the three components $\hat{r}_k$ of the unit vector $$\hat{r} = \frac{r}{|r|}$$

and the well-known Christoffel symbol $\epsilon_{ijk}$, by $\Im_{ij}(\hat{r})=\epsilon_{ijk}\hat{r}_k$, so that $\Im(\hat{r})p=\hat{r}\times p$.

There is known theory that can be used to relate the information capacity C of the communication channel to the matrix $\hat{H}$. More specifically, a quantity $M(\hat{H})$, referred to as the "mutual information" between the transmitter and the receiver, expresses the rate at which information can be transferred between a transmit antenna or antenna array of n elements, and a receive antenna or antenna array of n elements. In practice, $\hat{H}$ will generally be found to fluctuate, due, for example, to environmental fluctuations or to movement of (mobile) antennas. However, under the assumptions that $\hat{H}$ is known to the receiver but not to the transmitter, and that the elements of $\hat{H}$ are uncorrelated Gaussian variables, the capacity C is given by the statistical expectation of $M(\hat{H})$ taken over the probability distribution of $\hat{H}$. It should be noted that if $\hat{H}$ is also known to the transmitter, the capacity will be even higher.

There is a simple theoretical expression for $M(\hat{H})$ when the components of additive noise measured by the receiver are uncorrelated Gaussian white noise with equal variance, the communication takes place over a bandwidth narrow enough for $\hat{H}$ to have negligible frequency dependence, $\hat{H}$ is time-independent, and the transmitted signals are uncorrelated white Gaussian stochastic processes with equal power. Choosing units such that the noise components have unit variance so that the same symbol ρ denotes both the total power and the signal-to-noise ratio, and letting I denote the n×n unit matrix, the mutual information is given under these assumptions by:

$$M(\hat{H})=\log_2 det[I+(\rho/n)\hat{H}\hat{H}^\dagger]\text{bits/s/Hz}.$$

Those skilled in the art will appreciate that at large values of the signal-to-noise ratio ρ for fixed $\hat{H}$, the expected value of the above expression, and thus the value of C, will tend to the value $(\log_2\rho)\times\text{rank}(\hat{H})$. Thus, the rank of $\hat{H}$ expresses an effective number of propagation channels. In free-space, line-of-sight communication, for example, $\text{rank}(\hat{H}_0)=2$, which is consonant with what was said above concerning the availability of only two polarization channels for such conditions.

We believe that in practice, especially in cities and within buildings, there will be many propagation environments in which the rank of $\hat{H}$ is 4, 5, or 6, thus affording an increase in the capacity of the wireless communication channel over what was previously believed possible. Local antennas that can take best advantage of such higher capacity will be designed, e.g., to respond to both electric and magnetic field components that would conventionally be expected to carry only duplicative, and not complementary, information.

Figure 3:
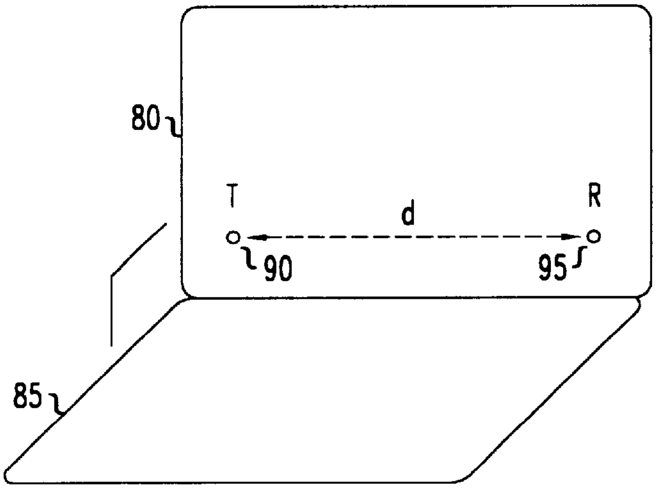
FIG. 3 is a schematic drawing of an idealized scattering environment that was subjected to theoretical analysis. Included in the figure are transmit antenna 90 and receive antenna 95.

We have performed a theoretical calculation that shows that, even in some relatively simple scattering environments, $\hat{H}$ would be expected to have a rank of 6. Our calculation modeled the scattering environment shown in FIG. 3, in which perfectly conducting planes 80 and 85 are oriented at right angles to each other in the y-z and x-y coordinate planes, respectively. Transmit antenna 90 and receive antenna 95 are spaced apart by a distance d (in units of one communication wavelength) along the line through the points (9.9, 7.7, 10.5) and (15.1, 109.8, 8.1). (Again, distances are measured in units of one wavelength.)

Figure 4:
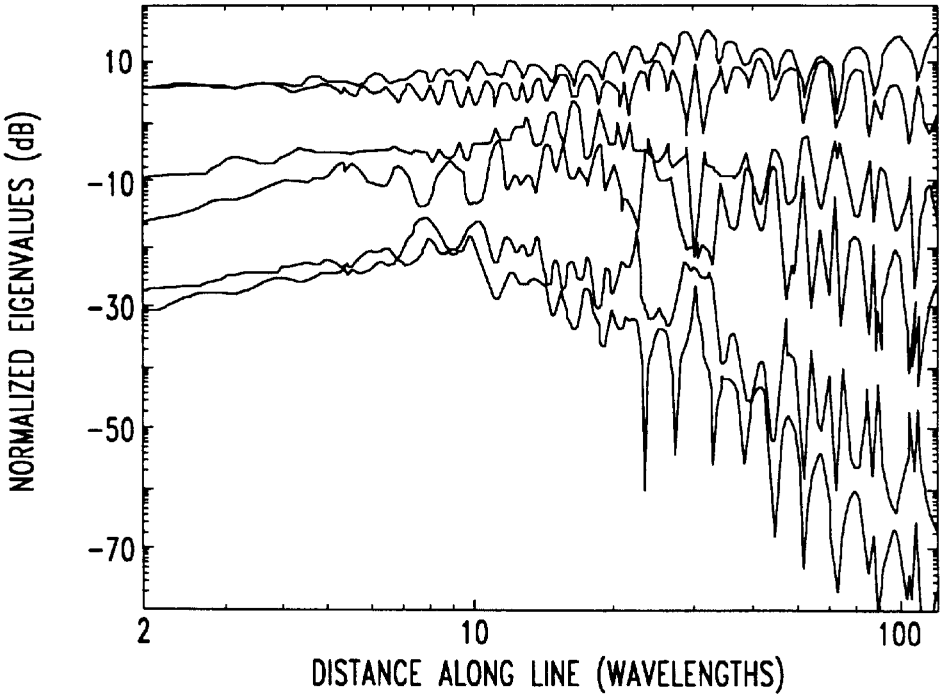
FIG. 4 is a graph of certain results of the theoretical analysis of the scattering environment of FIG. 3. Specifically, the figure is a graph showing the eigenvalues of the propagation matrix $\hat{H}$ at various distances between transmit antenna 90 and receive antenna 95.

In FIG. 4, we have plotted the resulting eigenvalues of the matrix $\hat{H}\hat{H}^\dagger$ (i.e., the squares of the singular values of the matrix $\hat{H}$), in units normalized to the (pair of equal) eigenvalues of $\hat{H}_0\hat{H}_0^\dagger$ for similarly separated antennas in free space. It is evident from the figure that no eigenvalues are equal to zero, even at a separation of one hundred wavelengths. It is also evident that at relatively large separation, there is a large spread in the eigenvalues. This is attributable to the fact that when the antennas are far apart, the reflections that make effective contributions to the scattering paths are reflections at glancing angles. Even at a separation of one hundred wavelengths, however, there are four eigenvalues clustered within a spread of only about four decades.

It is interesting to note that in general, for a random n×n matrix H with independent entries, the singular values are distributed according to the Wigner-Dyson semicircle law. This implies that for a randomly chosen matrix H, there will always be some singular values close to zero. However, theoretical studies of the channel capacity of random matrix channels show that the capacity increases in proportion to n. (See, e.g., I. E. Telatar, "Capacity of multi-antenna gaussian channels," *European Transactions on Telecommunications* 10, 585–595 (1999).) Therefore, we do not expect the presence of a few small singular values to affect the basic result, namely an n-fold increase in the channel capacity. The matrix H will be substantially random in at least some scattering environments. When six polarizations are utilized in such an environment, we thus expect as much as a sixfold increase in capacity, particularly at large values of the signal-to-noise ratio.

We have made and successfully tested a tripolarized antenna composed of three orthogonal sleeve elements of the kind described in the book J. D. Kraus, *Antennas,* 2d Ed., McGraw-Hill, Boston (1988). The feed points for the three sleeve elements were co-located. Each sleeve element had two variable-length segments for adjustment to efficiently couple radiation to its respective transmission line. Each sleeve element was approximately 17 cm, or one-half wavelength, in length, and was trimmed for efficient resonant operation at 880 MHz by adjusting the variable-length segments. Each sleeve element had less than 5% power reflected back to the transmitting source, and there was less than −25 dB of power coupling between any element and any other. The tripoloarized antenna can create an arbitrarily oriented vector electric dipole moment when operated in transmission. To also create an arbitrarily oriented magnetic dipole moment, it would be possible to add three further resonant structures sensitive to the magnetic field component, such as mutually orthogonal loop elements co-located with the three sleeve elements.

Of course, an antenna need not be specifically constructed of three dipole and three loop elements in order to enjoy the advantages of wireless communication as described here. An appropriate antenna may have only one or two dipole elements, or none at all. Similarly, it may have one or two loop elements, or none at all. It is sufficient for the antenna to have four or more current outputs from which complementary information can be obtained when the antenna is operated receivingly, or through which complementary information can be imposed on transmitted radiation. The requisite sensitivity may be provided by one or more elements that deviate from the strict definition of a dipole element or loop. One example of an element that is not, strictly speaking, a dipole element or loop is a slotted sphere having taps at points of appropriate sensitivity.

It should also be noted that the sensitivity to oscillating magnetic field components afforded by a simple conductive loop can also be afforded by elements of other conformations. These alternative conformations include, by way of example, compound loops composed from multiple simple loop elements. Other alternative conformations include split ring resonators and arrangements of multiple split ring resonators as described, e.g., in D. R. Smith et al., "Composite Medium with Simultaneously Negative Permeability and Permittivity," *Phys. Rev. Lett.* 84 (May 1, 2000) 4184–4187. We will use the term "loop element" to denote any such substantially planar element that is selected for use primarily for its coupling to the magnetic, rather than the electric, component of electromagnetic radiation.

One receptive mode of communication according to our invention involves demodulating four or more current outputs from an antenna arrangement selected to be responsive to both the electric component and the corresponding magnetic component of at least one incident electromagnetic wave; and combining the four or more demodulated outputs to recover signal information in one or more signal channels. Significantly, there will be at least one incident electromagnetic wave whose electric and magnetic components make independent contributions to a total capacity for recovering signal information from the current outputs.

In one approach to the recovery of signal information, the receiver circuitry includes demodulators arranged to separately demodulate each of the current outputs, so that a respective baseband signal will be obtained corresponding to each of the current outputs. In an alternative approach, the receiver circuitry is configured to form a weighted sum of some or all of the current outputs, and then to obtain a baseband signal by demodulating the weighted sum. In such an arrangement, the respective weights are advantageously adjusted so as to obtain the best possible baseband signal.

As mentioned above, the method of communication described here will be beneficial even without the utilization of spatial diversity. Thus, the use of localized antennas, as described above, will often be advantageous.

If, for example, the receiver circuitry provides multiple, separately demodulated baseband signals, a variety of techniques are available to take advantage of diversity (in this case, polarization diversity) for enhanced recovery of signal information from such baseband signals. Some of these techniques have been previously described in the context of signal recovery from spatially distributed antenna arrays of the kind that provide spatial diversity.

More specifically, there are at least two ways to utilize polarization diversity for enhanced signal recovery. These are: (a) to increase redundancy in a transmitted signal corresponding to a single communication channel, leading to improved quality in the received signal; and (b) to increase the capacity of the propagation channel by sending independent signals corresponding to distinct communication channels. The first of these effects is sometimes referred to as "receive diversity," and the second is sometimes referred to as "transmit diversity."

Several co-pending patent applications, commonly assigned herewith, describe techniques for achieving spatial diversity using spatially extended antenna arrays. These include application Ser. No. 08/673981, filed on Jul. 1, 1996 by G. J. Foschini, application Ser. No. 09/060657, filed on Apr. 15, 1998 by G. J. Foschini et al., application Ser. No. 09/587396, filed on Jun. 5, 2000 by G. J. Foschini et al., and application Ser. No. 09/438900, filed on Nov. 12, 1999 by B. Hassibi.

The advantages of polarization diversity from tripolarized antennas have previously been discussed in the co-pending patent application, commonly assigned herewith, Ser. No. 09/379151 and a continuation-in-part thereof, also commonly assigned herewith, Ser. No. 09/477972.

By way of example, when a CDMA modulation scheme is used, receive diversity is advantageously achieved by applying the same signal successively to each input connection of the transmission antenna. Each copy of the transmitted signal thus has a corresponding time delay (which may be regarded as zero if one of the three copies is taken as the reference signal). A RAKE receiver at the receiving location will interpret each of these time delays as corresponding to a distinct echo. The RAKE receiver will apply known techniques to compile the various received echoes, both actual and simulated, into a recovered signal having optimal, or near-optimal, noise characteristics. RAKE receivers are described, e.g., in J. G. Proakis, *Digital Communications,* 3d Ed., WCB Division of McGraw-Hill, 1995, pp. 795–806.

There are other methods for deriving increased benefit from receive diversity that are applicable even when CDMA is not used. In this regard, it should be noted that the greatest diversity is achieved between signals that are statistically independent. Thus, when parallel channels contain substantially the same communication data, it is advantageous to process the respective base-band signals in such a way that they are effectively randomized, i.e., de-correlated, with respect to each other. Timing jitter, as in the CDMA scheme described above, provides one type of randomization. Another type of randomization is provided in the form of random codes. For example, when three parallel signals are to be transmitted, two of them are multiplied at baseband by respective sequences of random digits, such as random binary sequences. The random sequences are known by the receiver and used for recovery of the original signal. Generally, the same sequences can be reused repeatedly. Thus, it is not necessary to continually generate new random code.

It is important to note in this regard that a 4-, 5-, or 6-polarized receiving antenna as described herein will generally provide useful benefits of receive diversity even when transmission is from but a single transmitting antenna element.

Figure 5:
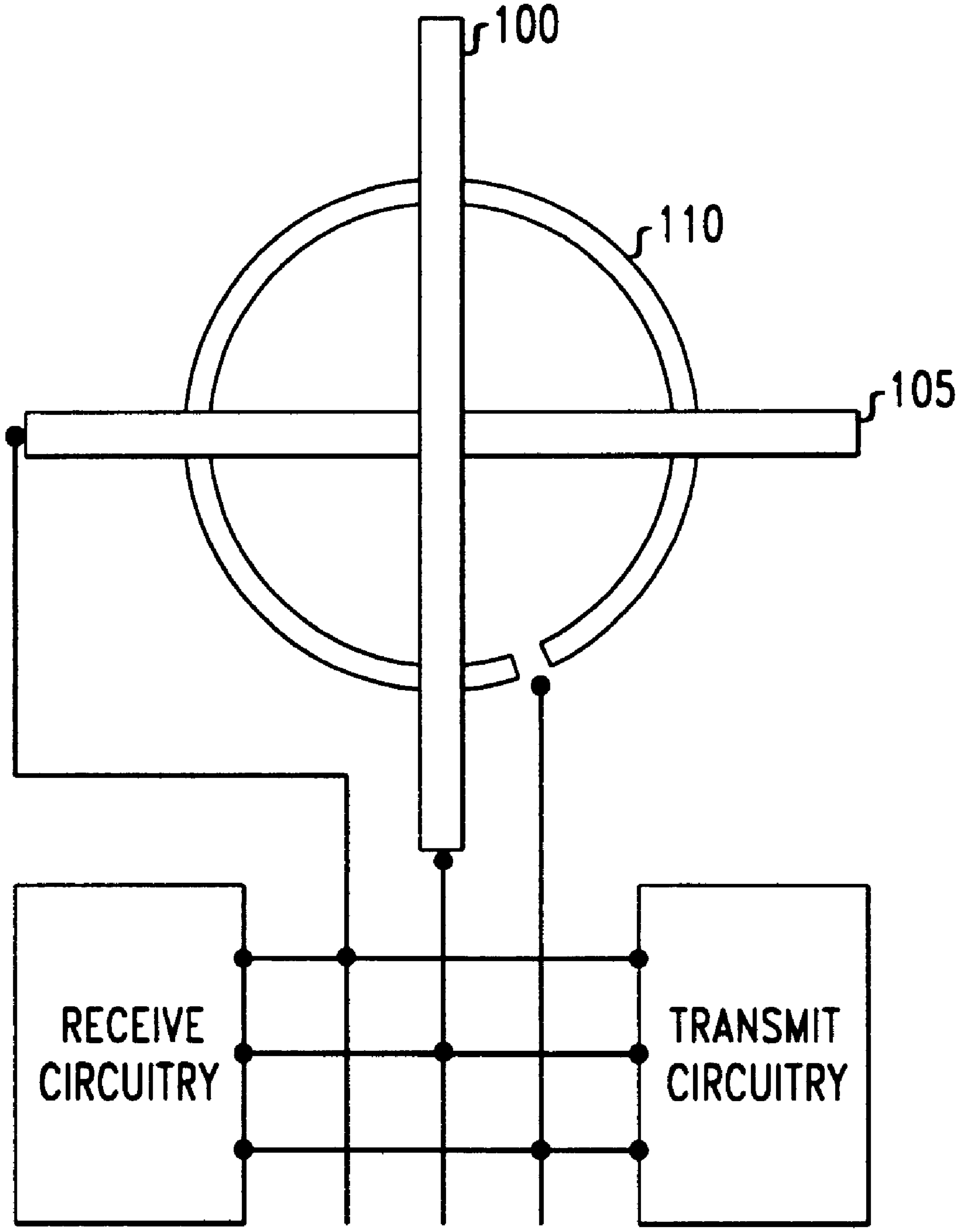
FIG. 5 is a simplified drawing of a substantially flat, tripolarized antenna according to the invention in one embodiment.

One particular subset of the six polarization channels we have described above consists of two mutually orthogonal electric polarizations, and a magnetic polarization in the third orthogonal direction. Such a selection of polarization channels can be utilized, for example, by an arrangement of two dipole elements 100, 105 and a loop element 110. As shown in FIG. 5, all three elements lie substantially in a plane. The dipole elements are not parallel to each other, and preferably are orthogonal to each other. In free-space, line-of-sight communication, the loop element would not be expected to provide an information channel independent from the dipole elements, but as we have explained above, it often would provide such an independent channel when operated in a rich scattering environment. Thus, such an arrangement can be operated to provide threefold polarization diversity from a very compact space such as would obtain, for example, within the cover of a laptop computer, cellular handset, or other wireless communication device. In particular, such an arrangement could readily be made with a maximum dimension no greater than the communication wavelength, and a total thickness no greater than, for example, one-fourth, or even one-tenth, the communication wavelength.

The invention claimed is:

1. A method of wireless communication, comprising:

(a) obtaining four or more outputs from an antenna arrangement selected to be responsive to both the electric component and the corresponding magnetic component of at least one incident electromagnetic wave; and (b) as a function of the four or more outputs, recovering signal information in one or more signal channels, the recovering step carried out such that said electric component and said magnetic component make at least partly complementary contributions to a total amount of signal information recovered from the outputs of the antenna arrangement over at least one time interval.

2. The method of claim 1, further comprising demodulating the four or more antenna outputs, and wherein the recovering step comprises combining the four or more demodulated outputs that result from the demodulating step.

3. The method of claim 1, wherein at least two of said outputs are tapped from respective electric dipole elements that together define a plane, and a further one of said current outputs is tapped from a loop element oriented substantially parallel to said plane.

4. The method of claim 1, wherein at least two of said outputs are tapped from respective non-parallel electric dipole elements, and at least two of said outputs are tapped from respective non-parallel loop elements.

5. The method of claim 1, wherein the communication is carried out at least at one radiofrequency transmission wavelength, and the antenna arrangement has a maximum dimension that is no more than said wavelength.

6. The method of claim 1, wherein the communication is carried out at least at one radiofrequency transmission wavelength, and the antenna arrangement has a maximum dimension that is no more than one-half said wavelength.

7. A method of wireless communication, comprising:

(a) modulating signal information in one or more signal channels onto a radiofrequency carrier so as to provide four or more carrier-level signals; and (b) applying each carrier-level signal to a respective input of an antenna arrangement of a kind that, when operated in reception, is responsive to both the electric component and the corresponding magnetic component of at least one incident electromagnetic wave, wherein (b) is carried out so as to impress at least partially independent signal information on, respectively, the electric and corresponding magnetic components of the outgoing counterpart of said incident electromagnetic wave.

8. The method of claim 7, wherein at least two of said carrier-level signals are applied to respective electric dipole elements that together define a plane, and a further one of said carrier-level signals is applied to a loop element oriented substantially parallel to said plane.

9. The method of claim 7, wherein at least two of said carrier-level signals are applied to respective non-parallel electric dipole elements , and at least two of said carrier-level signals are applied to respective non-parallel loop elements.

10. The method of claim 7, wherein the communication is carried out at least at one radiofrequency transmission wavelength, and the antenna arrangement has a maximum dimension that is no more than said wavelength.

11. The method of claim 7, wherein the communication is carried out at least at one radiofrequency transmission wavelength, and the antenna arrangement has a maximum dimension that is no more than one-half said wavelength.

12. A method of wireless communication at least at one communication wavelength, comprising:

(a) demodulating a first and a second current output from two respective non-parallel electric dipole elements having orientations that together define a plane, and demodulating a third current output from a loop element oriented substantially parallel to said plane; and (c) combining the first, second, and third demodulated outputs, thereby to recover signal information in one or more signal channels, wherein: the combining step is carried out such that said three outputs make at least partly complementary contributions to a total amount of signal information recovered over at least one time interval, and the two dipole elements and the loop element together occupy a space no greater than one communication wavelength in maximum extent parallel to said plane, and no greater than one-fourth a communication wavelength in extent perpendicular to said plane.

13. The method of claim 12, wherein the two dipole elements and the loop element together occupy a space no greater than one-tenth a communication wavelength in extent perpendicular to said plane.

14. A method of wireless communication at least at one communication wavelength, comprising:

(a) modulating signal information in three signal channels onto a radiofrequency carrier so as to provide first, second, and third carrier-level signals; and (b) applying the first and second carrier-level signals to respective non-parallel electric dipole elements of an antenna arrangement wherein said dipole elements have orientations that together define a plane, and applying the third carrier-level signal to a loop element of the antenna arrangement oriented substantially parallel to said plane, wherein the two dipole elements and the loop element together occupy a space no greater than one communication wavelength in maximum extent parallel to said plane, and no greater than one-fourth a communication wavelength in extent perpendicular to said plane.

15. The method of claim 14, wherein the two dipole elements and the loop element together occupy a space no greater than one-tenth a communication wavelength in extent perpendicular to said plane.

* * * * *